US009395801B2

United States Patent
Wang

(10) Patent No.: US 9,395,801 B2
(45) Date of Patent: Jul. 19, 2016

(54) FINGER DETECTION DEVICE AND METHOD OF FINGERPRINT RECOGNITION INTEGRATED CIRCUIT

(71) Applicant: Image Match Design Inc., Hsinchu (TW)

(72) Inventor: Ting-Sing Wang, Hsinchu County (TW)

(73) Assignee: IMAGE MATCH DESIGN INC., Hsinchu (TW)

( * ) Notice: Subject to any disclaimer, the term of this patent is extended or adjusted under 35 U.S.C. 154(b) by 177 days.

(21) Appl. No.: 14/482,470

(22) Filed: Sep. 10, 2014

(65) Prior Publication Data
US 2015/0071511 A1 Mar. 12, 2015

(30) Foreign Application Priority Data

Sep. 10, 2013 (TW) ............................. 102132438 A

(51) Int. Cl.
*G01R 27/26* (2006.01)
*G06F 1/32* (2006.01)
*G06K 9/00* (2006.01)
*G06F 3/044* (2006.01)

(52) U.S. Cl.
CPC ............ *G06F 1/3262* (2013.01); *G06F 1/3231* (2013.01); *G06F 3/044* (2013.01); *G06K 9/0002* (2013.01)

(58) Field of Classification Search
CPC ....... G06F 3/044; G06F 3/045; G06F 3/0488; G06F 3/04883; G06F 3/07886; G06F 3/0412; G06F 3/0414; G06F 3/0416; G01R 27/2605; G01D 5/24; G01D 5/2415; G01D 5/2412; G01D 5/2417; H01H 11/005; H01H 11/0056; H01L 2924/01079; H01L 2924/01078
USPC .................... 324/658–661, 686, 688, 750.17; 245/173, 174
See application file for complete search history.

(56) References Cited

U.S. PATENT DOCUMENTS

| | | | | |
|---|---|---|---|---|
| 4,394,773 A * | 7/1983 | Ruell | ................... | A61B 5/1172 310/318 |
| 5,325,442 A * | 6/1994 | Knapp | ................... | G01B 7/004 361/278 |
| 5,864,296 A * | 1/1999 | Upton | ................... | G06K 9/0002 178/17 D |
| 6,234,031 B1 * | 5/2001 | Suga | ................... | G06K 9/0002 73/862.474 |
| 6,483,931 B2 * | 11/2002 | Kalnitsky | ................ | G06F 3/044 324/661 |
| 7,141,918 B2 * | 11/2006 | Scott | ................... | G06K 9/00885 310/317 |
| 8,175,344 B2 * | 5/2012 | Funahashi | .......... | G06K 9/00114 382/124 |
| 2013/0287274 A1 * | 10/2013 | Shi | ....................... | G06K 9/0002 382/124 |

* cited by examiner

*Primary Examiner* — Tung X Nguyen
*Assistant Examiner* — Thang Le
(74) *Attorney, Agent, or Firm* — Muncy, Geissler, Olds & Lowe, P.C.

(57) ABSTRACT

A finger detection device and method of a fingerprint recognition IC is disclosed. The device comprises sensing electrodes, a capacitive sensing layer, a signal processing circuit, a multiplexer module and a signal register. The sensing electrodes are defined as a fingerprint sensing zone. The capacitive sensing layer covers the sensing electrodes. The signal processing circuit is arranged below and electrically connected with the sensing electrodes. The multiplexer module defines a finger detection zone. The finger detection zone includes at least one of the sensing electrodes. The signal register is electrically connected with the signal processing circuit, receiving a detection signal generated by the finger detection zone and comparing the detection signal with a preset value. The finger detection device uses only a portion of the sensing electrodes to detect a finger approaching/contacting it to determine triggering or sleeping of the fingerprint recognition IC and thus reduces power consumption.

10 Claims, 3 Drawing Sheets

FINGER DETECTION DEVICE AND METHOD OF FINGERPRINT RECOGNITION INTEGRATED CIRCUIT

BACKGROUND OF THE INVENTION

1. Field of the Invention

The present invention relates to a finger detection device and method, particularly to a finger detection device and method of a fingerprint recognition integrated circuit.

2. Description of the Prior Art

Nowadays, people pay more and more attention to privacy, information safety and possession security. Thus, biological recognition technologies are developed to screen multitudinous objects and recognize authenticated users therefrom. The biological recognition technologies are based on an individual's unique biological features, including the fingerprint, face, iris, and sound of the individual. Among them, fingerprint recognition is used more extensively because it is simpler in technology and cheaper in equipment.

Among various fingerprint recognition technologies, the capacitive type fingerprint recognition technology is the most promising one because the elements thereof can be fabricated into IC featuring high element density and easy to package.

However, the conventional fingerprint recognition devices have to always stand by to recognize the users anytime. Therefore, they are very power consuming, especially portable fingerprint recognition devices, whose electricity storage is likely to be exhausted soon.

SUMMARY OF THE INVENTION

The objective of the present invention is to provide a finger detection device and method of a fingerprint recognition integrated circuit, wherein the finger detection device comprises a multiplexer module defining a portion of sensing electrodes as a finger detection zone, and wherein the fingerprint recognition integrated circuit is in a sleeping state if the finger detection zone does not detect a finger approaching or contacting it, and wherein the fingerprint recognition integrated circuit is waked up if the finger detection zone detects a finger approaching or contacting it, whereby the finger detection zone reduces the power consumption of the fingerprint recognition integrated circuit. The present invention is particularly suitable to a portable capacitive type fingerprint recognition integrated circuit.

To achieve the abovementioned objective, one embodiment of the present invention proposes a finger detection device of a fingerprint recognition integrated circuit, which comprises a plurality of sensing electrodes, a capacitive sensing layer, a signal processing circuit, a multiplexer module, and a signal register. The plurality of sensing electrodes is arranged into an array and defined as a fingerprint sensing zone. The capacitive sensing layer covers the plurality of sensing electrodes. The signal processing circuit is arranged below the sensing electrodes and electrically connected with the sensing electrodes. The multiplexer module includes at least one of a first multiplexer and a second multiplexer. The first multiplexer is electrically connected with the sensing electrodes along a first direction. The second multiplexer is electrically connected with the sensing electrodes along a second direction. The first direction is perpendicular to the second direction. The multiplexer module triggers at least one of the first multiplexer and the second multiplexer and defines a finger detection zone. The finger detection zone includes at least one of the sensing electrodes. The signal register is electrically connected with the signal processing circuit, receiving a detection signal generated by the finger detection zone and comparing the detection signal with a preset value.

Another embodiment of the present invention proposes a finger detection method of a fingerprint recognition integrated circuit, which comprises a step: providing a finger detection device of a fingerprint recognition integrated circuit and defining a finger detection zone, wherein the finger detection device of the fingerprint recognition integrated circuit comprises a plurality of sensing electrodes, a capacitive sensing layer, a signal processing circuit, a multiplexer module, and a signal register. The plurality of sensing electrodes is arranged into an array and defined as a fingerprint sensing zone. The capacitive sensing layer covers the sensing electrodes. The signal processing circuit is arranged below the sensing electrodes and electrically connected with the sensing electrodes. The multiplexer module includes at least one of a first multiplexer and a second multiplexer. The first multiplexer is electrically connected with the sensing electrodes along a first direction. The second multiplexer is electrically connected with the sensing electrodes along a second direction. The multiplexer module triggers at least one of the first multiplexer and the second multiplexer and defines a finger detection zone. The finger detection zone includes at least one of the sensing electrodes. The signal register is electrically connected with the signal processing circuit. The finger detection method further comprises steps: triggering the finger detection zone to generate a detection signal, and transmitting the detection signal to the signal register via the signal processing circuit; and comparing the detection signal with a preset value; restarting the fingerprint sensing zone if the detection signal is greater than (or smaller than) the preset value; switching the fingerprint sensing zone into a sleeping state if the detection signal is smaller than (or greater than) the preset value.

Below, embodiments are described in detail in cooperation with the attached drawings to make easily understood the objectives, technical contents, characteristics and accomplishments of the present invention.

DESCRIPTION OF THE PREFERRED EMBODIMENT

Figure 1:
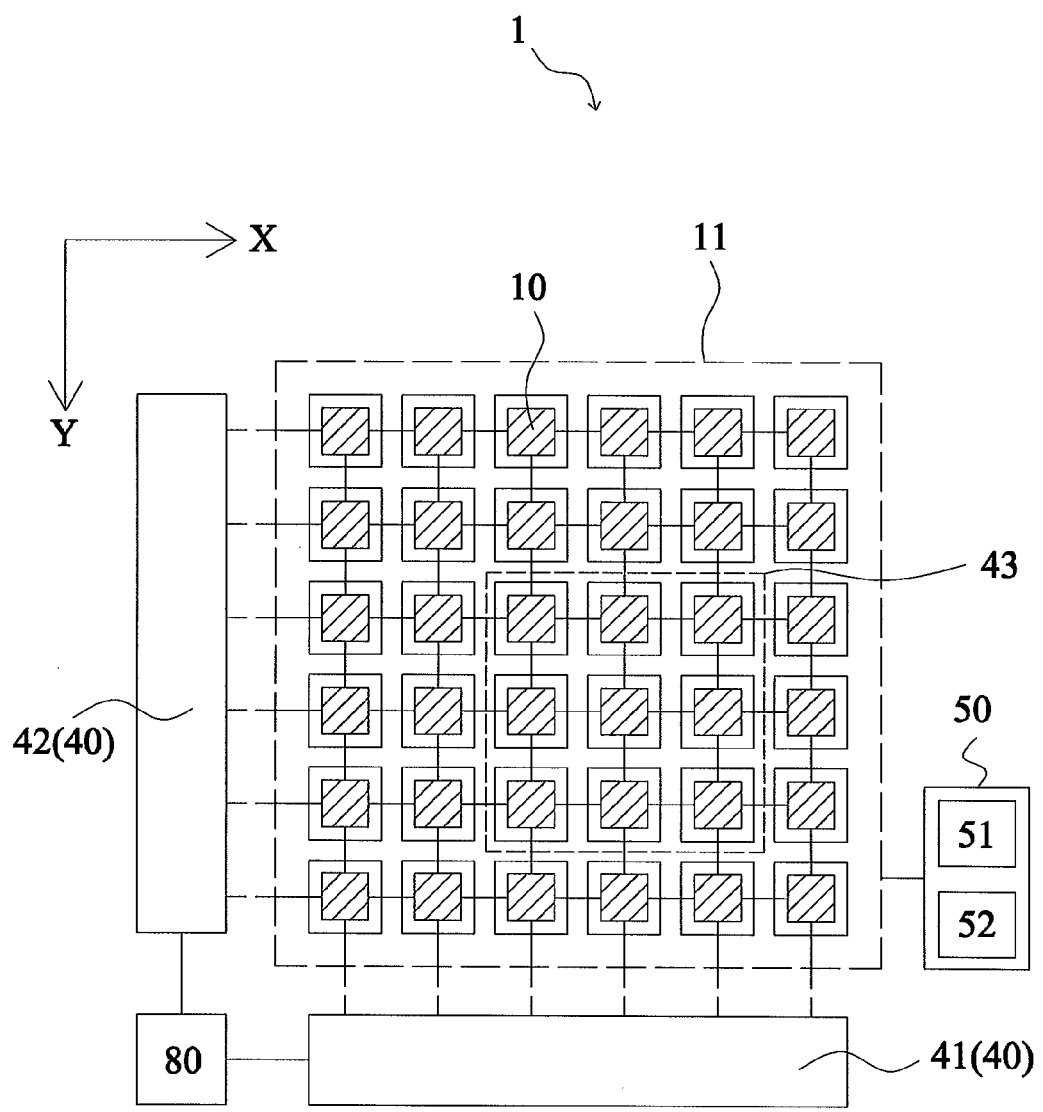
FIG. 1 is a top view schematically showing a finger detection device of a fingerprint recognition integrated circuit according to one embodiments of the present invention.
Figure 2:
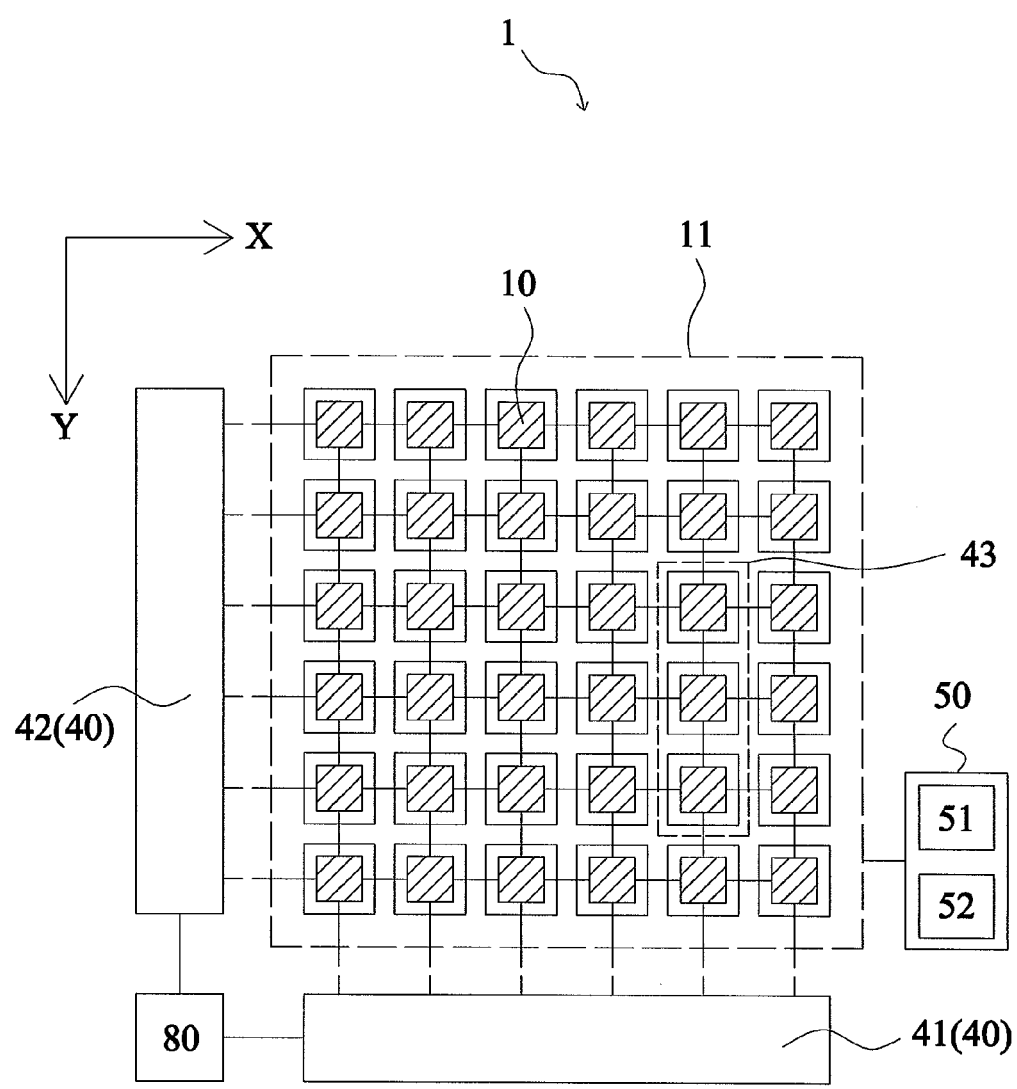
FIG. 2 is a top view schematically showing a finger detection device of a fingerprint recognition integrated circuit according to another embodiment of the present invention.
Figure 3:
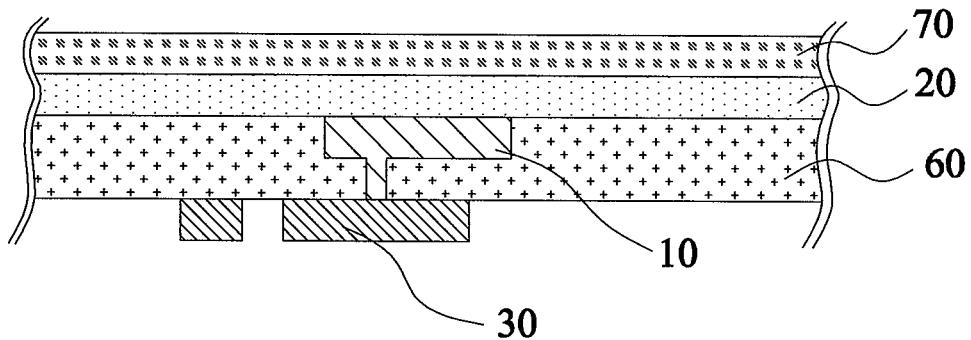
FIG. 3 is a sectional view schematically showing a part of a finger detection device of a fingerprint recognition integrated circuit according to one embodiment of the present invention.

Refer to FIGS. 1-3. FIG. 1 and FIG. 2 are top views schematically showing a finger detection device of a fingerprint recognition integrated circuit according to different embodiments of the present invention. FIG. 3 is a sectional view schematically showing a part of a finger detection device of a fingerprint recognition integrated circuit according to one embodiment of the present invention. The finger detection device 1 of a fingerprint recognition integrated circuit of the present invention comprises a plurality of sensing electrodes 10, a capacitive sensing layer 20, a signal processing circuit 30, a multiplexer module 40, and a signal register 50. The plurality of sensing electrodes 10 is arranged into an array and defined as a fingerprint sensing zone 11. The capacitive sensing layer 20 covers the plurality of sensing electrodes 10. In one embodiment, the capacitive sensing layer 20 is fabricated via depositing silicone nitride or via depositing silicon nitride and silicon oxide alternately. The signal processing circuit 30 is arranged below the sensing electrodes 10 and electrically connected with the sensing electrodes 10. The multiplexer module 40 includes at least one of a first multiplexer and a second multiplexer 42. The first multiplexer 41 is electrically connected with the sensing electrodes 10 along a first direction X. The second multiplexer 42 is electrically connected with the sensing electrodes 10 along a second direction Y. The first direction X is perpendicular to the second direction Y. The multiplexer module 40 triggers at least one of the first multiplexer 41 and the second multiplexer 42 and defines a finger detection zone 43. The finger detection zone 43 includes at least one of the sensing electrodes 10. The signal register 50 is electrically connected with the signal processing circuit 30, receiving a detection signal generated by the finger detection zone 43 and comparing the detection signal with a preset value.

Refer to FIG. 1 and FIG. 2 again. In one embodiment, the finger detection zone 43 undertakes scanning continually at a specified frequency to generate detection signals, whereby the finger detection zone 43 is in a detection state persistently. For example, the finger detection zone 43 detects the capacitance induced by a finger approaching or contacting the finger detection zone 43 and obtains a potential drop signal, whereby to determine whether to trigger the fingerprint recognition integrated circuit. If the potential drop signal is higher (or lower) than a threshold value, the fingerprint recognition integrated circuit is restarted or kept in a triggered state. If the potential drop signal is lower (or higher) than a threshold value, the fingerprint recognition integrated circuit is switched to or kept in a sleeping state. In the present invention, the finger detection device 1 does not trigger the whole fingerprint recognition integrated circuit but only triggers a portion of the sensing electrodes 10 to form a finger detection zone 43. The finger detection device 1 of the present invention also automatically detects whether there is a finger approaching or contacting the finger detection zone 43 to switch the fingerprint recognition integrated circuit into a triggered state or a sleeping state. Therefore, the finger detection device 1 of the present invention can reduce power consumption. In the present invention, the finger detection zone 43 is a point type detection zone, a linear type detection zone (as shown FIG. 2), a surface type detection zone (as shown in FIG. 1), or a combination thereof. In the present invention, a point type detection zone includes a point or several points of the sensing electrodes 10; a linear type detection zone includes a strip zone or several strip zones of the sensing electrodes 10, which are horizontal, vertical or oblique; the surface type detection zone is a rectangular area of the sensing electrodes 10 (such as the sensing electrodes 10 in form of an array), a regular-shape area of the sensing electrodes 10, or an irregular shape area of the sensing electrodes 10.

Refer to FIG. 1 and FIG. 2 again. In one embodiment, the signal register 50 includes a computation unit 51 calculating the detection signals. For example, the computation unit 51 undertakes addition operations or other calculation operations of the obtained detection signal and compares the result of the calculation operations with the preset value to determine whether to switch the fingerprint recognition integrated circuit into a triggered state or a sleeping state. In one embodiment, the signal register 50 includes a comparison unit 52 comparing the detection signal (or the result of the calculation operations) with the preset value.

Refer to FIG. 3 a sectional view schematically showing a part of a finger detection device of a fingerprint recognition integrated circuit according to one embodiment of the present invention. The finger detection device 1 of a fingerprint recognition integrated circuit of the present invention further comprises an insulating layer 60 and a protection layer 70. The insulating layer 60 is arranged between the sensing electrodes 10 and the signal processing circuit 30, separating the capacitive sensing layer 20 and the signal processing circuit 30 and preventing from interference or short circuit. The protection layer covers the capacitive sensing layer 20, protecting the capacitive sensing layer 20 and the sensing electrodes 10 from being damaged by external factors.

Figure 4:
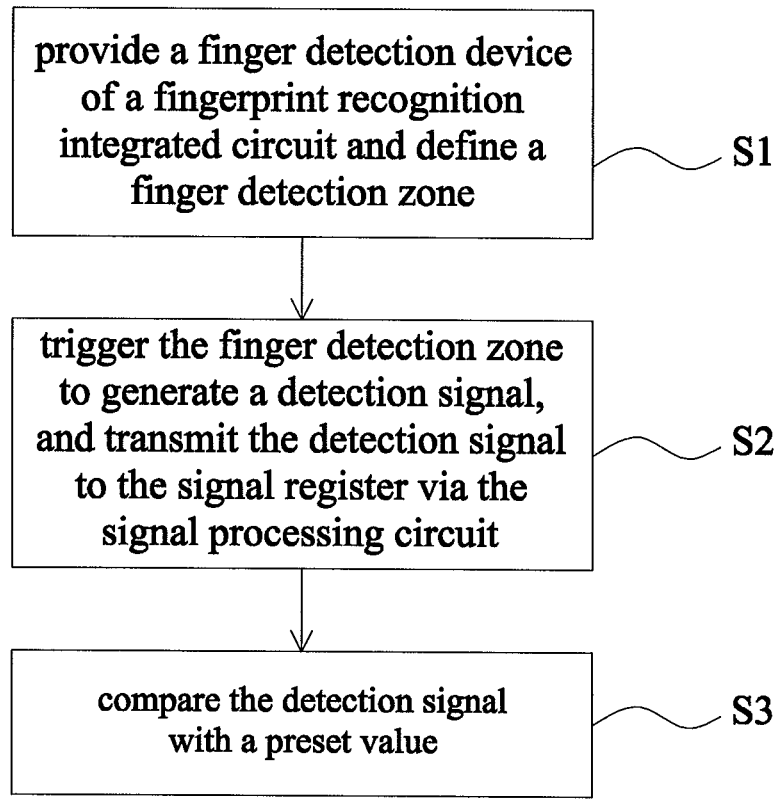
FIG. 4 is a block diagram showing the flowchart of a finger detection method of a fingerprint recognition integrated circuit according to one embodiment of the present invention.

Refer to FIG. 4 a block diagram showing the flowchart of a finger detection method of a fingerprint recognition integrated circuit according to one embodiment of the present invention. Also refer to FIGS. 1-3 simultaneously. In Step S1, provide a finger detection device 1 of a fingerprint recognition integrated circuit and define a finger detection zone 43. The finger detection device 1 of a fingerprint recognition integrated circuit of the present invention comprises a plurality of sensing electrodes 10, capacitive sensing layer 20, a signal processing circuit 30, a multiplexer module 40, and a signal register 50. The plurality of sensing electrodes 10 is arranged into an array and defined as a fingerprint sensing zone 11. The capacitive sensing layer 20 covers the plurality of sensing electrodes 10. The signal processing circuit 30 is arranged below the sensing electrodes 10 and electrically connected with the sensing electrodes 10. The multiplexer module 40 includes at least one of a first multiplexer and a second multiplexer 42. The first multiplexer 41 is electrically connected with the sensing electrodes 10 along a first direction X. The second multiplexer 42 is electrically connected with the sensing electrodes 10 along a second direction Y. The multiplexer module 40 triggers at least one of the first multiplexer 41 and the second multiplexer 42 and defines a finger detection zone 43. The finger detection zone 43 includes at least one of the sensing electrodes 10. The signal register 50 is electrically connected with the signal processing circuit 30.

Next, in Step S2, trigger the finger detection zone 43 to generate a detection signal, and transmit the detection signal to the signal register 50 via the signal processing circuit 30. Next, in Step S3, compare the detection signal with a preset value. Next, in Step S4, restart the fingerprint sensing zone 11 or keep the fingerprint sensing zone 11 in a triggered state if the detection signal is greater than (or smaller than) the preset value; switch the fingerprint sensing zone 11 from a triggered state into a sleeping state or keep the fingerprint sensing zone 11 in a sleeping state if the detection signal is smaller than (or greater than) the preset value. The principle and embodiments of the finger detection device 1 of a fingerprint recognition integrated circuit of the present invention have been described above and will not repeat again herein.

In conclusion, the present invention proposes a finger detection device and method of a fingerprint recognition integrated circuit, wherein a multiplexer module defines a portion of sensing electrodes as a finger detection zone. While the finger detection zone does not detect a finger approaching or contacting it, the fingerprint recognition integrated circuit is kept in a sleeping state. While the finger detection zone detects a finger approaching or contacting it, the fingerprint recognition integrated circuit is waked up. Therefore, the finger detection device and method of the present invention can reduce power consumption of a fingerprint recognition integrated circuit and is particularly suitable to a capacitive type fingerprint recognition integrated circuit of a portable electronic device.

The technical contents and characteristics of the present invention have been demonstrated with the embodiments described above and the attached drawings to enable the persons skilled in the art to understand, make, and use the present invention. However, it should be understood that these embodiments and drawings are only to exemplify the present invention but not to limit the scope of the present invention. Any equivalent modification or variation according to the spirit of the present invention is to be also included within the scope of the present invention.

What is claimed is:

1. A finger detection device of a fingerprint recognition integrated circuit, comprising
    a plurality of sensing electrodes arranged into an array and defined as a fingerprint sensing zone;
    a capacitive sensing layer covering said sensing electrodes;
    a signal processing circuit arranged below said sensing electrodes and electrically connected with said sensing electrodes;
    a multiplexer module including at least one of a first multiplexer and a second multiplexer, wherein said first multiplexer is electrically connected with said sensing electrodes along a first direction, and wherein said second multiplexer is electrically connected with said sensing electrodes along a second direction, and wherein said first direction is perpendicular to said second direction, and wherein said multiplexer module triggers at least one of said first multiplexer and said second multiplexer and defines a finger detection zone, and wherein said finger detection zone includes at least one of said sensing electrodes; and
    a signal register electrically connected with said signal processing circuit, receiving a detection signal generated by said finger detection zone, and comparing said detection signal with a preset value.

2. The finger detection device of the fingerprint recognition integrated circuit according to claim 1, wherein said signal register includes a computation unit calculating said detection signal.

3. The finger detection device and method of the fingerprint recognition integrated circuit according to claim 1, wherein said signal register includes a comparison unit comparing said detection signal with said preset value.

4. The finger detection device of the fingerprint recognition integrated circuit according to claim 1, further comprising
    an insulating layer arranged between said sensing electrodes and said signal processing circuit; and
    a protection layer covering said capacitive sensing layer.

5. The finger detection device of the fingerprint recognition integrated circuit according to claim 1, further comprising a control unit electrically connected with said multiplexer module, determining an area of said finger detection zone, and controlling said multiplexer module to define said finger detection zone.

6. A finger detection method of a fingerprint recognition integrated circuit, comprising steps:

providing a finger detection device of a fingerprint recognition integrated circuit and defining a finger detection zone, wherein said finger detection device of said fingerprint recognition integrated circuit comprises:
    a plurality of sensing electrodes arranged into an array and defined as a fingerprint sensing zone;
    a capacitive sensing layer covering said sensing electrodes;
    a signal processing circuit arranged below said sensing electrodes and electrically connected with said sensing electrodes;
    a multiplexer module including at least one of a first multiplexer and a second multiplexer, wherein said first multiplexer is electrically connected with said sensing electrodes along a first direction, and wherein said second multiplexer is electrically connected with said sensing electrodes along a second direction, and wherein said multiplexer module triggers at least one of said first multiplexer and said second multiplexer and defines a finger detection zone, and wherein said finger detection zone includes at least one of said sensing electrodes; and
    a signal register electrically connected with said signal processing circuit;
triggering said finger detection zone to generate a detection signal, and transmitting said detection signal to said signal register via said signal processing circuit; and
comparing said detection signal with a preset value; restarting said fingerprint sensing zone if said detection signal is greater than (or smaller than) said preset value; switching said fingerprint sensing zone into a sleeping state if said detection signal is smaller than (or greater than) said preset value.

7. The finger detection method of the fingerprint recognition integrated circuit according to claim 6, wherein said signal register includes a computation unit that calculates said detection signal and transmits a result of calculating said detection signal to said signal register via said signal processing circuit.

8. The finger detection method of the fingerprint recognition integrated circuit according to claim 6, wherein said finger detection device further comprises a control unit that determines an area of said finger detection zone and controls said multiplexer module to define said finger detection zone.

9. The finger detection method of the fingerprint recognition integrated circuit according to claim 6, wherein said finger detection zone generates said detection signals continually at a specified frequency.

10. The finger detection method of the fingerprint recognition integrated circuit according to claim 6, wherein said finger detection zone is a point type detection zone, a linear type detection zone, a surface type detection zone, or a combination thereof.

* * * * *